May 4, 1965  H. W. MITCHELL ETAL  3,182,327
INSTRUMENT LANDING SYSTEM
Filed Jan. 25, 1961  4 Sheets-Sheet 1

INVENTOR
HARRY W. MITCHELL
JEFF E. FREEMAN
BY John Gibson Semmes
ATTORNEY

May 4, 1965 H. W. MITCHELL ETAL 3,182,327
INSTRUMENT LANDING SYSTEM
Filed Jan. 25, 1961 4 Sheets-Sheet 4

*DEMODULATOR*

*AMPLIFIERS (A AND B)*

INVENTOR
*HARRY W. MITCHELL
JEFF E. FREEMAN*
BY *John Gibson Semmes*
ATTORNEY 3,182,327
INSTRUMENT LANDING SYSTEM
Harry W. Mitchell and Jeff E. Freeman, Fort Worth, Tex., assignors to Bell Aerospace, Wheatfield, N.Y., a corporation of Delaware
Filed Jan. 25, 1961, Ser. No. 84,882
3 Claims. (Cl. 343—108)

The present invention relates to a method for instrument landing wherein navigational coordinates are used as references in determination of the position of a body in space.

Rectangular, as well as hyperbolic, navigational coordinates are conventionally used as an aid in determination of aircraft, helicopter or other body in space heading, relative ground speed and lateral displacement. However, the present method while utilizing navigational coordinates for such purposes, also use these coordinates as references in determination of the displacement of a body in space or aircraft from a predetermined landing path. Furthermore, according to the present method these coordinates may be used as references in determining the glide slope distance, that is the percentage of glide slope remaining until touchdown.

Thus, according to the present method, the following types of information are obtainable in a single system: lateral displacement from a desired course, vertical displacement from a computed glide slope, glide slope distance information, course heading deviation and relative ground speed.

According, it is an object of invention to provide a method for utilization of navigational coordinates in determination of the vertical position of a body in space.

Another object of invention is to provide a method for utilization of navigational coordinates to determine vertical displacement of a body in space from a computed glide slope.

Another object of invention is to provide a method for utilizing navigational coordinates to provide glide slope distance information.

Yet another object of invention is to provide a method for determination of the vertical position of a body in space with respect to a predetermined glide slope path by comparison of said body's fore and aft navigational distance from a predetermined landing spot and altimeter information.

Yet another object of invention is to provide a method wherein information pertaining to an aircraft's vertical and lateral displacement from a predetermined landing path may be displayed conjointly with heading information.

This invention will be described with reference to a helicopter embodiment because an embodiment of the system has been designed with an eye to helicopter end use. However, it will be obvious that the system can be applied to any aircraft use.

Yet additional objects of invention will become apparent from the ensuing specification and attached drawings wherein.

Figure 1:
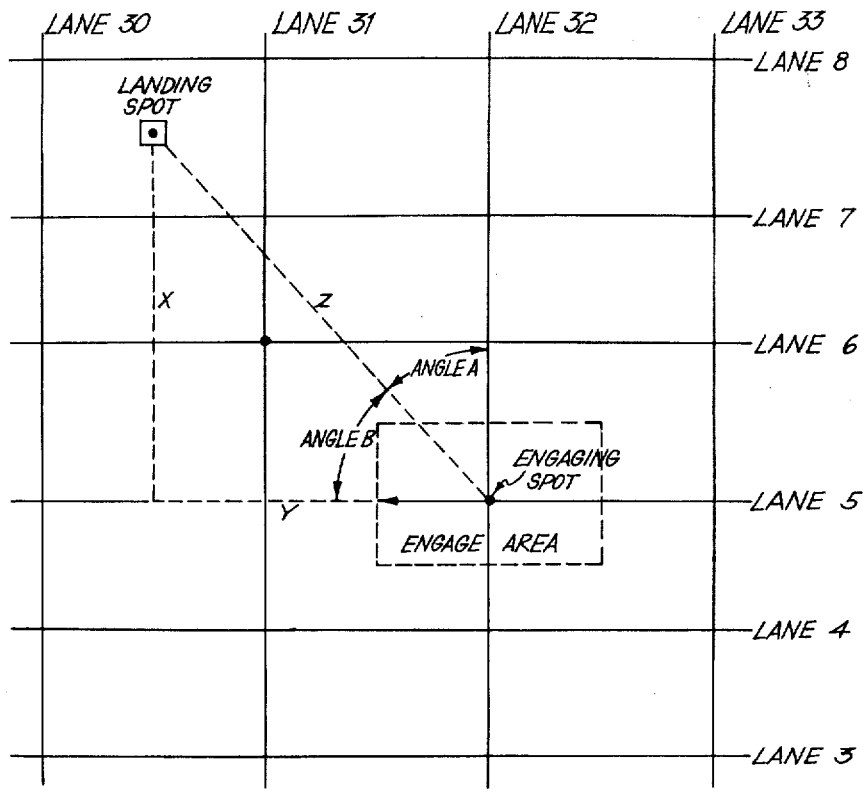
FIG. 1 is a plot of navigational lanes to show flight computer functions wherein landing path z is determined by triangulation of the position of a removed engaging spot with respect to the landing spot.

The landing spot shown in FIGURE 1 is an arbitrarily selected spot with reference to the Decca lanes, of which the pilot has a map in the cockpit. No preparation of the landing area in the nature of providing a beacon signal is required. The pilot selects a spot for landing with reference to the lanes as shown on his Decca map. For example, on FIG. 1, he has selected a point for landing between lanes 30 and 31 and between lanes 7 and 8. He has also selected the starting end of his programmed glide slope to be at the intersection of lanes 5 and 32. He dials in this information to the computer, thus establishing the glide slope from the "engaging spot" at lanes 5 and 32 to the landing spot. Of course, at the same time, he decides and programs in the altitude at which he plans to initiate the engaging end of the glide slope. He then flies toward this selected engaging spot.

By "engaging" is meant causing the system servos (FIG. 5) to be driven by the navigation inputs from the existing Decca system. He must be careful to come within a half lane of the selected engaging spot before engaging these servos to the existing Decca navigation system as the system does not know one lane from another. To illustrate, considering the fore and aft, or "X" distance, if he were to engage more than half a lane away from the programmed engaging spot, the indicated voltage would not be with reference to the engagement lane 5, but rather with reference to the adjacent or closer lane 4. The Decca inputs would then not be keyed in or compared with the proper lane.

By engaging to the Decca system, the system is caused to apply a voltage that is compared to that applied by the computer (both indicating respective distances from the lanes), the difference being a measure of the difference between the actual position of the helicopter and the programmed position. For example, if he were to engage the Decca system while directly over the engaging spot, then as far as the fore and aft "X" and lateral "Y" positions are concerned, the respective voltages from the computer and from the Decca system would be nulled. As soon as he deviates from the programmed path, the voltages applied by the Decca system are not nulled by those applied by the computer system, the indicators reflect this to the pilot, and he flies so as to correct it and achieve a null, thus placing him on the proper path. The altimeter input correspondingly (and concurrently) is compared to the desired altitude information supplied by the computer as a function of the horizontal distance $z$ to touchdown.

Figure 2:
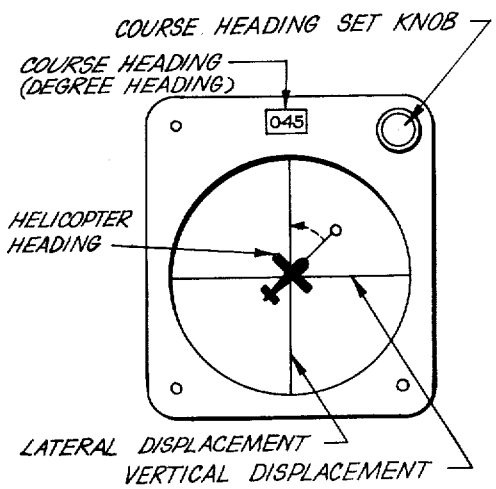
FIG. 2 is a front elevation of a heading (cross pointer) indicator wherein a helicopter position is silhouetted with respect to course heading and intersecting vertical displacement and lateral displacement needles, the helicopter as illustrated being precisely on the predetermined landing path.

Glide slope heading may be displayed conventionally on the heading cross pointer indicator as shown in FIG. 2 wherein 45° course heading has been set and heading information is obtained from a remote type compass system. Such heading information may first be applied to a differential synchro positioned by the course heading set knob which in turn displays the course heading vertically, thus permitting the pilot to fly the airplane to the vertical needle.

Figure 3:
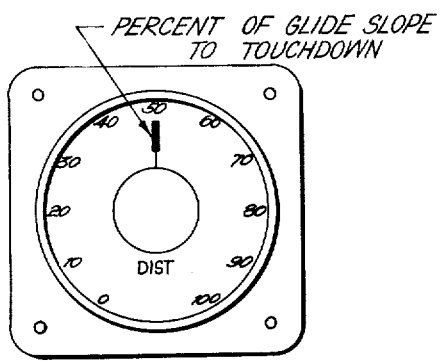
FIG. 3 is a front elevation of a glide slope distance-to-go indicator wherein the percentage of glide slope remaining to touchdown may be obtained.

Glide slope distance-to-go information is displayed upon the indicator illustrated in FIG. 3 and is readable in percent of glide slope remaining to touchdown.

Figure 5:
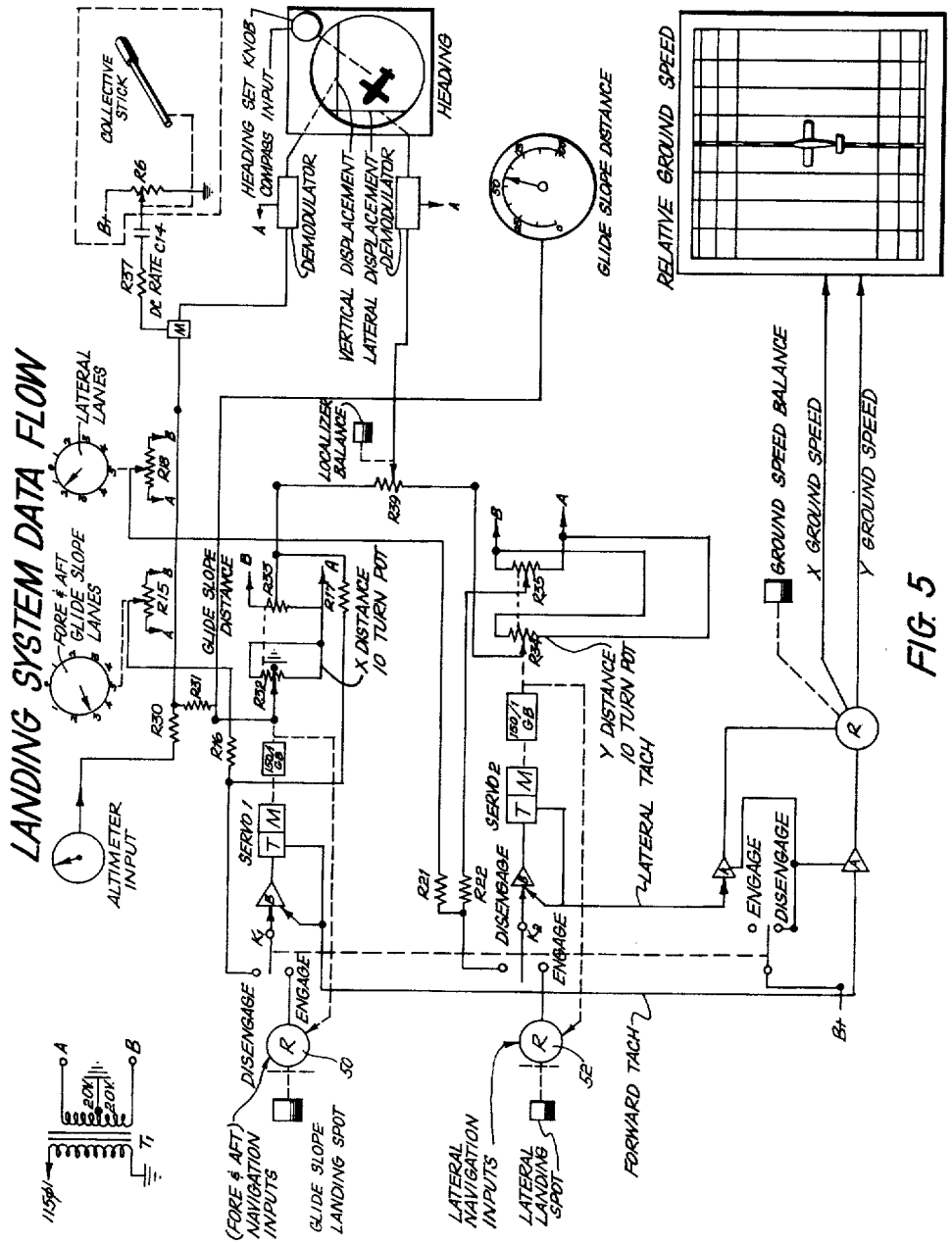
FIG. 5 is a schematic of a data flow circuit which may be employed according to the present method.

Glide slope vertical displacement information is obtainable from a remote area instrument landing system as shown in FIG. 5 comparing the helicopter's fore and aft navigational distance from the landing spot and altimeter data, with a preset glide slope, the difference being vertical displacement from the preset glide slope. The error signal resulting from this comparison is then added to or subtracted from the collective rate feedback signal to be amplified, demodulated and applied to the vertical displacement needle of the heading cross pointer indicator of FIG. 2. The combining of the collective rate feedback signal (that is, the signal reflecting the rate of change of collective pitch of the rotor), and the vertical displacement error signal (difference in actual altitude from programmed altitude), as applied to the vertical displacement needle of the heading cross point indicator of FIGURES 2 and 5, permits an asymptotic approach to the selected glide slope.

Horizontal displacement information originates also in the remote area instrument landing system or like computer and is a function of comparing $x$ fore and aft navigational distance to $y$ lateral distance of FIG. 1, the difference between these distances and the programmed distance being horizontal displacement from the desired landing path $z$. This displacement is amplified demodulated and applied to the horizontal displacement needle on the heading cross pointer indicator of FIG. 2.

Figure 4:
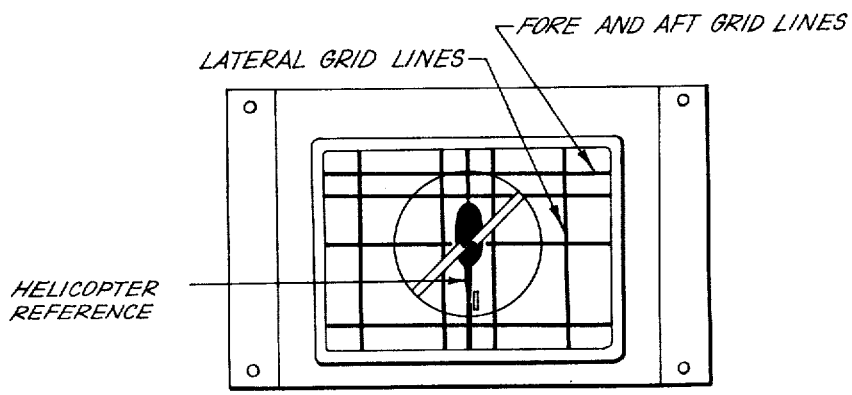
FIG. 4 is an illustration of a conventional ground speed indicator wherein helicopter speed is displayed in terms of moving fore and aft and lateral red lines.

Relative ground speed may be derived from the rate that $x$ and $y$ distances decrease or increase and is applied to a conventional gridline type indicator, as illustrated in FIG. 4. These distances are obtained by amplifying tach feedback voltages developed by servo 1 and servo 2 and applying said voltages to the ground speed balance resolver, which is positioned according to angle of course heading shown in FIG. 2. This resolver in turn drives the gridline indicator shown in FIG. 3.

Computer functions are illustrated in schematic FIG. 5. The fore and aft navigation inputs comprise two signals, each having a voltage amplitude 90° out of phase with each other when applied to glide slope lane resolver 50. These voltages constitute a vector that rotates through 360° for each navigational lane, mile or increment traveled through by the carrier vehicle. This rotating vector could be monitored by nulling the output of resolver 50 by means of glide slope landing spot knob, which mechanically positions resolver case 50, with respect to the resolver rotor (not illustrated) which is positioned by servo gear train No. 1.

The lateral navigation input comprises two signals, each having a voltage amplitude 90° out of phase with each other. When applied to lateral landing spot resolver 52 these voltages constitute a vector that rotates 360° for each lane, mile or increment traveled through by the carrier vehicle. This rotating vector could be monitored by nulling the output of resolver 52 by means of the lateral landing spot knob, which mechanically positions resolver case 52 with respect to the resolver rotor (not illustrated) positioned by servo gear train No. 2.

In order to provide altitude error information, the altitude voltage output must be 180° out of phase with the distance signal obtained from servo 1 resistor 32.

Collective stick input is a rate term whose time constant is controlled by resistor 37 and capacitor 14. As the collective stick is moved up or down, capacitor 14 will charge or discharge, depending upon the collective stick motion. Current created by this network is applied to magnetic modulator (M) whose output is summed with the glide slope deviations, and applied to the glide slope demodulator that positions the vertical displacement needle An A.C. signal is so phased out of magnetic modulator (M) to move the vertical displacement needle up with an up motion of the collective stick.

Servo 1 is comprised of a phase sensitive motor M that drives a gear train 150/1GB, which positions two $x$ distance 10-turn potentiometers R32 and R33 and a resolver rotor 50. Servo 1 motor is driven by an A.C. amplifier designated as amplifier B, having its input controlled by switch K–1 which may be of the 3-pole double throw manual or remotely operated relay type. The operation of servo 2 is identical in operation to servo 1 except for the hook-up of the $y$ distance 10-turn potentiometers R34 and R35.

Figure 6:
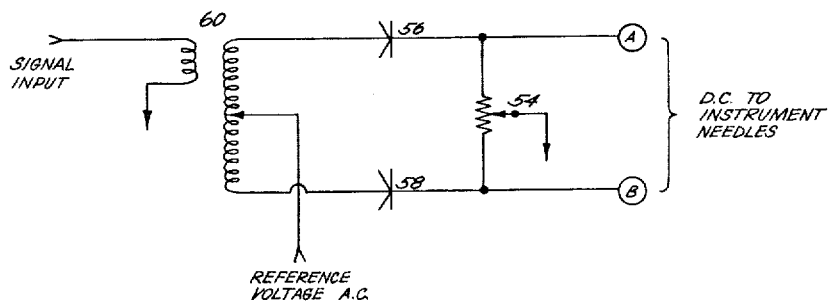
FIG. 6 is a schematic of vertical displacement and lateral displacement demodulators of the balance diode type and utilizable according to the present invention.

The vertical displacement and lateral displacement demodulators used in this system may be of the standard balance diode type, as illustrated in FIG. 6. With no signal input, the output points A and B will be at the same voltage potential. Resistor 54 is adjusted to take care of any component unbalance. A D.C. potential to ground caused by the A.C. reference voltage, being rectified in diode 56 and diode 58, could be measured from output point A or B. When a signal voltage is applied to transformer 60 unbalanced voltage condition will be present at output points A and B. This unbalanced condition positions the glide slope or lateral needle, and is caused by the phasewise adding or subtracting of the signal voltage from the reference voltage in reference voltage transformer 60.

Figure 7:
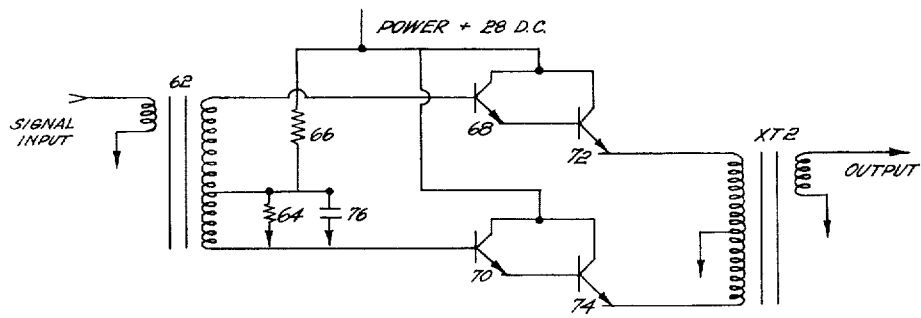
FIG. 7 is a schematic of amplifiers of the types A and B which may be used in the present system.

Amplifiers A and B (illustrated in FIG. 7) are identical in operation; therefore, only one description shall be given for both types. With plus 28 volts D.C. applied without signal to input transformer 62, resistors 64 and 66 serve as a bias network for transistors 68 and 70, which respectively bias transistors 72 and 74, so that a very slight conduction is present in all transistors. Condenser 76 serves the purpose of by-passing the A.C. input signal that is applied to input transformer 62 to ground, thereby causing the polarities on each end of transformer 62 secondary, to be opposite in phase, referenced to ground. This voltage is then applied to respective emitter followers in transistors 68, 72 and 70, 74 which in turn current amplify the input signal, and impress the signal across output transformer 78.

The landing system computer data flow is herewith described. With the computer system in disengaged position, servo 1 will drive to the position commanded by the glide slope landing knob. This knob positions a potentiometer that is excited by phases A and B, which are 180° out of phase. Therefore, for a zero lane position, the knob will be in the center of its travel, where a null voltage could be measured on the wiper of resistor 15. Now, should the glide slope landing knob be placed in the plus 2.5 lanes position, servo 1 would drive 2.5 revolutions from the center of the 10 turns potentiometers. This commanded servo position is developed at resistor 15, and is compared with the signal developed at potentiometer 33 through resistors 16 and 17 and their sum is thereby applied to servo amplifier B through switch K–1. This closes the servo loop in the disengaged position. It should be noted that a second loop is involved in stabilizing this servo, other than the position feedback, and this is a rate feedback which is taken from the motor tachometer and is fed into the input of the servo amplifier.

Glide slope landing spot servo 1 is in the 2.5 lanes position. This dictates that the 10-turn potentiometers are 2.5 turns from their center, and that the glide slope landing resolver rotor (not illustrated) has turned 2.5 revolutions from the no lanes position, and a voltage equivalent of 2.5 lanes distance is present at the wiper of resistor 32.

This voltage is then applied to resistor 31 where it is compared with the altimeter input, that is applied through resistor 30. The sum of these two signals is then applied to the vertical displacement demodulator, along with the rate feedback signal from the collective network. The combination of these two signals dictates the position of the vertical displacement or glide slope needle, thereby making it possible to fly the carrier vehicle to the altitude commanded by the glide slope landing knob (the longer the glide slope, the higher the altitude).

Servo 2, in operation, is functionally the same as servo 1 except that servo 2 is controlled in the disengaged position by potentiometer 18 and its position feedback is controlled by potentiometer 35. These signals are compared in resistors 21 and 22 and their sum is applied through switch K-2 to the servo amplifier that drives servo 2 motor and gear train. Should resistor 18 be placed on the 1.5 lanes position, servo 2 would turn the 10-turn potentiometers to a position of 1.5 turns from the center, and the resolver rotor (not illustrated) attached to the same gear train would drive through 1.5 revolutions from the zero lanes position. With this information set into the computer as predescribed, navigational conditions as shown on FIG. 1 would be present. Thus, a voltage equivalent to Y distance to the touch down point would be present on the wiper of resistor 34 and a voltage equivalent to X distance to the touchdown point would be present on the wiper of resistor 33. These two voltages are applied to each end of resistor 39 which is the localizer balance potentiometer. This potentiometer is then nulled to center the localizer lateral displacement needle on the cross pointer instrument. It should be noticed that the lateral landing spot and glide slope landing spot resolvers are each set in position one-half revolution from the lane null position; therefore, the cases of said resolvers are rotated to cause the lane null, and the engaged point null to coincide. This, in turn, causes the 10-turn potentiometers to be at the null position when the landing spot is reached.

After the landing spot resolvers have been nulled to their proper settings and the carrier vehicle enters into the proper engage area as illustrated in FIG. 1, switches K-1 and K-2 are placed in the engaged position. The servos are now positioned by the fore and aft and lateral navigation inputs from thier respective signal sources. The carrier vehicle is now commanded to fly the dotted line Z illustrated in FIG. 1, and any deviations from Z would produce an error signal measurable at the wiper of potentiometer 39. This error signal is then applied to the demodulator that positions the lateral displacement needle on the cross pointer instrument. As the carrier vehicle moves toward the landing spot, the glide slope distance indicator will show the decrease in percentage of distance remaining until touchdown. Also as this distance decreases, the distance voltage on potentiometer 32 decreases, causing an unbalanced condition at the junction of resistors 30 and 31. To null this condition, the carrier vehicle has to lose altitude, thereby establishing a glide slope.

Relative ground speed is obtained as follows. The tachometer voltages which are proportional to the carrier vehicle's movement through the lanes concerned, are applied to power amplifiers (type A) which excite a ground speed balance resolver, positioned to angle A of FIG. 1. The resolver voltage output is then used conventionally to provide relative ground speed information.

The glide slope distance indicator illustrated in FIG. 3 may be used in conjunction with the remote area landing system to display glide slope distance information. This information is taken from the remote area instrument landing system or like computer in the form of a 400 cycle signal, which is then applied to the distance indicator. (A.C. voltmeter movement, calibrated in percent of glide slope remaining to touchdown or landing.)

Accordingly, it will be seen that the present method provides for the utilization of conventional instrumentation so as to obtain from rectangular navigational coordinates information pertaining to the vertical position of an aircraft with respect to a landing spot. Manifestly, numerous other circuits may be employed and the circuit illustrated in FIG. 5 may be modified readily without departing from the spirit and scope of invention as defined in the subjoined claims.

We claim:

1. A system for the instrument landing of an aircraft from an arbitrarily selected engaging spot onto an arbitrarily selected landing spot, when said aircraft is flying within a system of navigational coordinates, comprising:

computer means for programming the glide slope between said landing spot and said engaging spot by correlating horizontal distance and altitude along said glide slope, said correlation having reference to the navigational coordinates lying closest to the relevant sector of said glide slope, means aboard said aircraft for engaging said navigational coordinates to obtain a first position signal indicating horizontal distance from said landing spot, altimeter means aboard said aircraft to obtain a second position signal indicating altitude, means for comparing said first position signal with the programmed horizontal distance of said glide slope to obtain a first error signal indicating horizontal deviation from said glide slope, and means for comparing said second position signal with the programmed altitude of said glide slope to obtain a second error signal indicating vertical deviation from said glide slope.

2. A system for the instrument landing of an aircraft from an arbitrarily selected engaging spot onto an arbitrarily selected landing spot, when said aircraft is flying within a system of navigational coordinates, comprising:

computer means for programming the glide slope between said landing spot and said engaging spot by correlating fore and aft distance, lateral distance and altitude along said glide slope, said correlation having reference to the navigational coordinates lying closest to the relevant sector of said glide slope, means aboard said aircraft for engaging said navigational coordinates to obtain a first position signal indicating fore and aft distance from said landing spot and a second position signal indicating lateral distance from said landing spot, altimeter means aboard said aircraft to obtain a third position signal indicating altitude, means for comparing said first position signal with the programmed fore and aft distance of said glide slope and for comparing said second position signal with the programmed lateral distance of said glide slope to obtain a heading error signal, and means for comparing said third position signal with the programmed altitude of said glide slope to obtain an altitude error signal.

3. A system for the instrument landing of an aircraft from an arbitrarily selected engaging spot onto an arbitrarily selected landing spot, when said aircraft is flying within a system of navigational coordinates comprising:

computer means for programming the glide slope between said landing spot and said engaging spot by correlating fore and aft distance, lateral distance and altitude along said glide slope, said correlation having reference to the navigational coordinates lying closest to the relevant sector of said glide slope, means aboard said aircraft for engaging said navigational coordinates to obtain a first position signal indicating fore and aft distance from said landing spot and a second position signal indicating lateral distance from said landing spot, altimeter means aboard said aircraft to obtain a third position signal indicating altitude, means for comparing said first position signal with the programmed fore and aft distance of said glide slope to obtain a first error signal indicating fore and aft deviation from said glide slope, means for comparing said second position signal with the programmed lateral distance of said glide slope to obtain a second error signal indicating lateral deviation from said glide slope, and means for comparing said third position signal with the programmed altitude of said glide slope to obtain a third error signal indicating vertical deviation from said glide slope.

References Cited by the Examiner
UNITED STATES PATENTS

| | | | |
|---|---|---|---|
| 2,393,337 | 1/46 | Phillips | 343—108 |
| 2,847,668 | 8/58 | Calvert | 343—108 |
| 3,065,463 | 11/62 | Turner | 343—9 |

CHESTER L. JUSTUS, *Primary Examiner.*